(12) United States Patent
Su

(10) Patent No.: US 6,535,500 B1
(45) Date of Patent: Mar. 18, 2003

(54) TRANSMITTER OF A MOBILE STATION IN A CDMA COMMUNICATIONS SYSTEM AND METHOD THEREFOR

(75) Inventor: Sung-Il Su, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/370,054

(22) Filed: Aug. 6, 1999

(51) Int. Cl.[7] .......................... H04B 1/69; H04B 1/04; H04B 7/216
(52) U.S. Cl. ........................ 370/342; 375/146; 455/126
(58) Field of Search ................................. 370/335, 329, 370/320, 337, 344, 342, 347, 537; 375/146; 455/123, 126, 127

(56) References Cited

U.S. PATENT DOCUMENTS

| | | | | |
|---|---|---|---|---|
| 5,159,608 A | * | 10/1992 | Falconer et al. | 375/130 |
| 5,204,874 A | * | 4/1993 | Falconer et al. | 370/209 |
| 5,629,955 A | * | 5/1997 | McDonough | 370/335 |
| 5,777,990 A | * | 7/1998 | Zehavi et al. | 370/335 |
| 5,940,434 A | * | 8/1999 | Lee et al. | 370/335 |

* cited by examiner

Primary Examiner—Wellington Chin
Assistant Examiner—William Schultz
(74) Attorney, Agent, or Firm—Dilworth & Barrese, LLP

(57) ABSTRACT

A transmitter provided in a mobile station of a CDMA communications system comprises a plurality of orthogonal modulators for orthogonal-modulating channel-coded transmitted signals with the orthogonal codes of corresponding channels, a plurality of gain adjustments for adjusting the gains of corresponding channels by selecting gain control signals of the channels or the complements of the gain control signals according to the orthogonal-modulated signals, and a plurality of circuits for separating the transmission signals of the gain adjusted channels into I-channel signals and Q-channel signals and band-spreading the I- and Q-channel signals with a PN sequence of the mobile station. A method for performing such transmission is also disclosed.

7 Claims, 3 Drawing Sheets

TRANSMITTER OF A MOBILE STATION IN A CDMA COMMUNICATIONS SYSTEM AND METHOD THEREFOR

BACKGROUND OF THE INVENTION

1. Field of the Invention

The present invention relates to a transmitter of a mobile station in a CDMA (Code Division Multiple Access) communications system, and more particularly to such transmitter for controlling the channel gain of a transmitted binary signal and integer-spreading it.

2. Description of the Related Art

Referring to FIG. 1 for illustrating the structure of the transmitter of a mobile station in a conventional CDMA communications system, the orthogonal modulator 111 multiplies the transmitted signal of each channel by a corresponding orthogonal code of the channel to orthogonal spread the channel. The orthogonal code may be a Walsh code. The long PN (pseudo-noise) code spreader 113 and short PN code spreader 115 spread the transmitted signal of each channel modulated with the orthogonal code. The long code is for identifying the mobile station, and the short code is for identifying the base station. The base band filter 117 filters the spread transmitted signal into the base band. The modulator 119 modulates the transmitted signal of the base band with a carrier wave.

Such a conventional transmitter of the mobile station spreads binary data which has not been adjusted for channel gain after orthogonal modulation, and then filters the spread binary data, so that it requires a circuit for binary mapping to obtain binary data. Furthermore, additional multipliers are necessary for spreading the obtained binary data in long code and short code, complicating the hardware structure. Although FIG. 1 does not show the additional parts for gain adjustment, it will be readily noted that the circuit for binary mapping is required including additional multipliers.

SUMMARY OF THE INVENTION

It is an object of the present invention to provide a CDMA mobile phone with a simplified circuit for adjusting the channel gain, and method therefor.

It is another object of the present invention to provide a CDMA mobile phone with a simplified circuit for band spreading, and method therefor.

It is another object of the present invention to provide a CDMA mobile phone with a circuit for band spreading with adjustment of the channel gain without binary mapping.

According to the present invention, a transmitter provided in the mobile station of the CDMA communications system comprises an orthogonal modulator for orthogonal-modulating channel-coded transmission signals with the orthogonal codes of corresponding channels, a gain control value generator for obtaining the complement of a first channel gain control value corresponding to each channel to generate a second channel gain control value, and a selection circuit for selecting one of the first and second channel gain control values by the orthogonal-modulated signals.

The present invention will now be described more specifically with reference to the drawings attached only by of example.

DETAILED DESCRIPTION OF THE PREFERRED EMBODIMENTS

Figure 1:
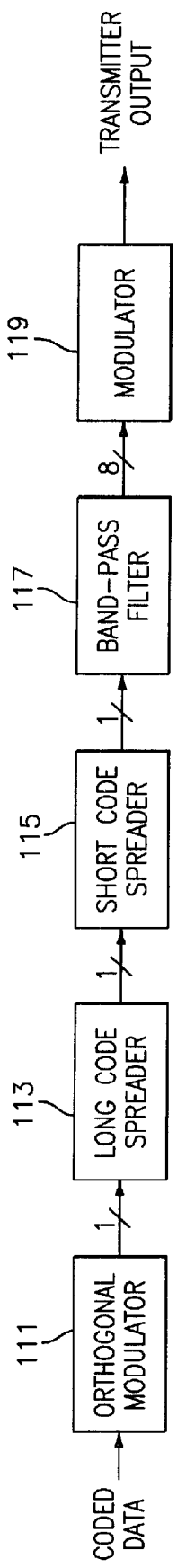
FIG. 1 is a block diagram for illustrating the structure of the transmitter of a conventional CDMA mobile station.
Figure 2:
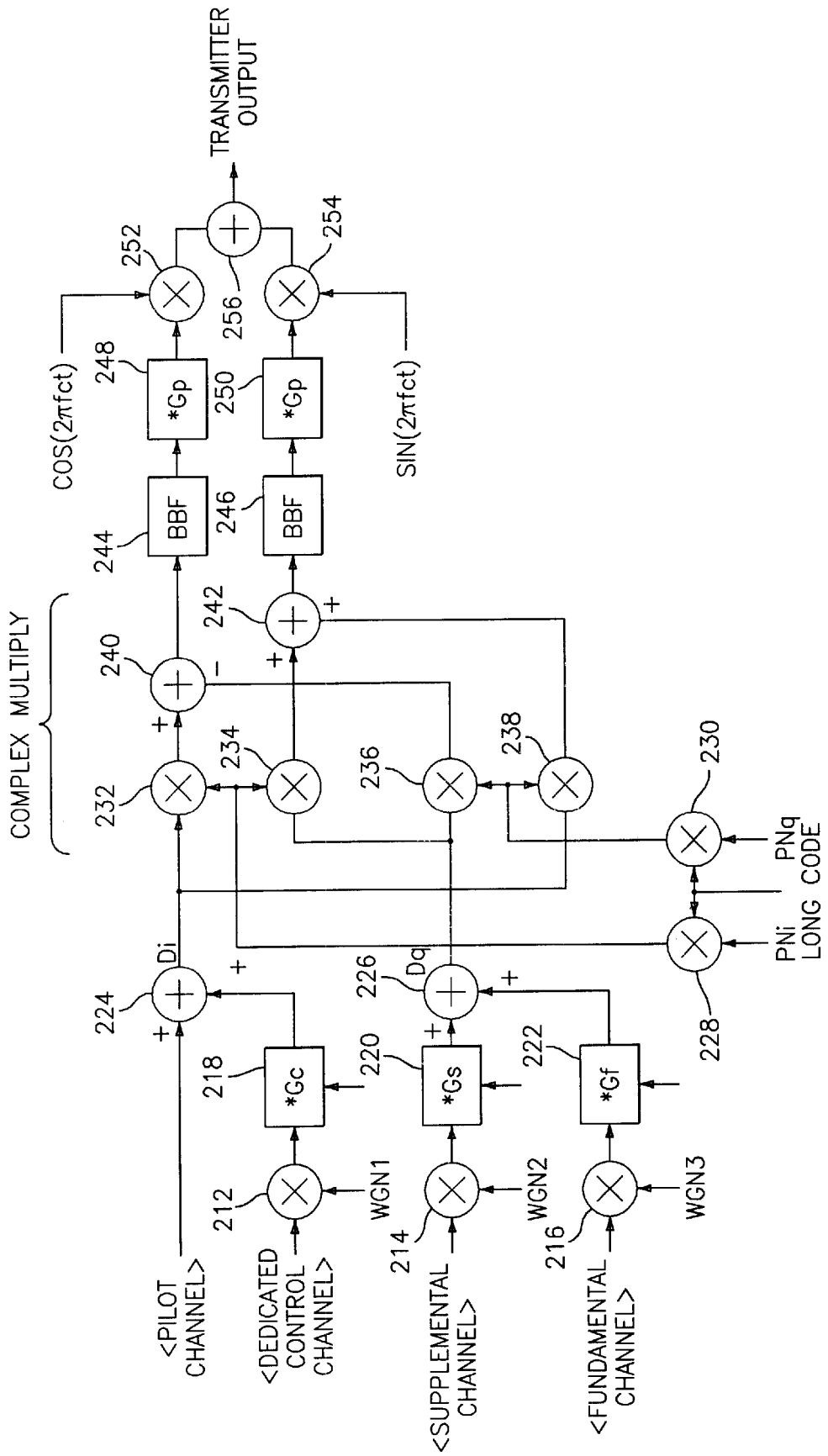
FIG. 2 is a schematic circuit diagram for illustrating the structure of the transmitter of a CDMA communications system according to the present invention.

Referring to FIG. 2, the transmitter of the mobile station of a CDMA communications system according to the present invention includes a pilot channel for transmitting a pilot signal, a dedicated control channel for exclusively transmitting the control data of the mobile station to the base station when a link is established, a supplemental channel for transmitting packet or video data to the base station, and a fundamental channel for transmitting voice data to the base station.

The signal of the dedicated control channel is multiplied by the orthogonal code WGN1 allotted to the control channel through a multiplier 212. The signal of the supplemental channel is multiplied by the orthogonal code WGN2 allotted to the supplemental channel through a multiplier 214. The signal of the fundamental channel is multiplied by the orthogonal code WGN3 allotted to the fundamental channel through a multiplier 216. These multipliers serve as the orthogonal modulators to respectively modulate the transmitted signals with corresponding orthogonal codes. The orthogonal codes are respectively allotted to the transmission channels, and may be Walsh codes.

The gain of the dedicated control channel is adjusted by a gain adjustment 218 controlling the output of the multiplier 212 with the gain control value Gc of the dedicated control channel. The gain of the supplemental channel is adjusted by a gain adjustment 220 controlling the output of the multiplier 214 with the gain control value Gs of the supplemental channel. The gain of the fundamental channel is adjusted by a gain adjustment 222 controlling the output of the multiplier 216 with the gain control value Gf of the fundamental channel. The pilot channel signal and the output of the gain adjustment 218 are combined by an adder 224. The output of the gain adjustment 220 and the output of the gain adjustment 222 are combined by an adder 226.

A multiplier 228 is provided to multiply a short PN sequence PNi of an I-channel by a long PN sequence (long code). A multiplier 230 is provided to multiply the short PN sequence PNq of a Q-channel by the long PN sequence. In this case, the long code represents the identification code allotted by the base station to the mobile station while the PN sequences PNi and PNq represent the identification code of the base station communicating with the mobile station. Hence, the short PN sequences and long code serve as the codes for the base station to distinguish the mobile station.

The output of the adder 224 and the output of the multiplier 228 are multiplied and spread by a multiplier 232. The output of the adder 226 and the output of the multiplier 228 are multiplied and spread by a multiplier 234. The output of the adder 226 and the output of the multiplier 230 are multiplied and spread by a multiplier 236. The output of the adder 224 and the output of the multiplier 230 are multiplied and spread by a multiplier 238. A subtractor 240 is also provided to subtract the output of the multiplier 236 from the output of the multiplier 232. The output of the multiplier 234 and the output of the multiplier 238 are combined by an adder 242. This arrangement allows for spreading the transmitted signal of each channel with the PN sequences, and in particular allows for complex spreading of the transmitted signal with the long code and with the short PN sequences.

The output signal of the subtractor 240 is filtered through a band-pass filter 244 into a base band. The output signal of the adder 242 is filtered through a band-pass filter 246 into a base band. The output signal of the band-pass filter 244 is controlled by a gain adjustment 248 according to a pilot channel gain control value Gp so as to adjust the total gain of the signal transmitted through the I-channel. The output signal of the band-pass filter 246 is controlled by a gain adjustment 250 according to the pilot channel gain control value Gp so as to adjust the total gain of the signal transmitted through the Q-channel. The output signal of the multiplier 248 is multiplied by a carrier wave $\cos(2\pi\ fct)$ through a multiplier 252, and the output signal of the multiplier 250 multiplied by a carrier wave $\sin(2\pi\ fct)$ through a multiplier 254. Finally, the output signals of the multipliers 252 and 254 are added by an adder 256 to produce the transmission signal of the mobile station. This arrangement constitutes the modulation. Thus, the data inputted through the channels are multiplied by their respective orthogonal codes corresponding with the multipliers 212 to 216 to produce the orthogonal-modulated signals.

Figure 3:
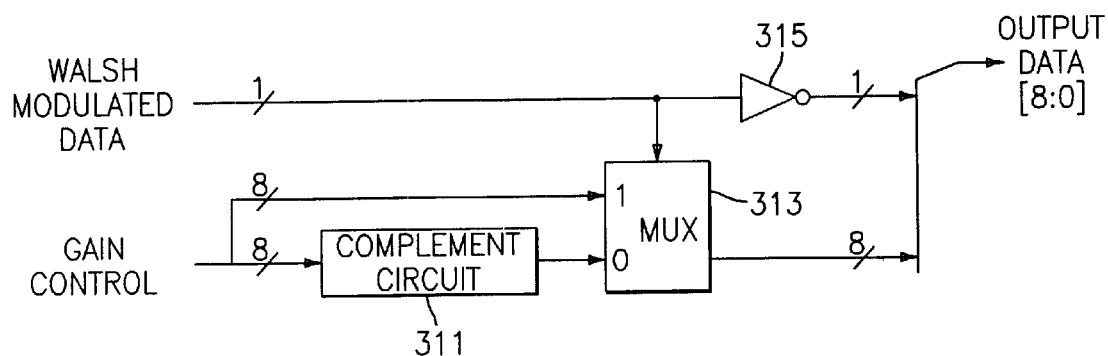
FIG. 3 is a block diagram for illustrating the structure of a gain adjustment for multiplying the orthogonal-modulated data of FIG. 2 by the channel gain.

Referring to FIG. 3, the structure of the gain adjustments 218,220,222 includes a 2's complement circuit 311 to convert the gain control value into a complement of "2". The gain control value and the complement of "2" are inputted to a multiplexer 313 which also receives an orthogonal-modulated signal as a selection signal. Thus, the multiplexer 313 selects the gain control value or the complement of "2" according to the logic of the orthogonal-modulated signal. Meanwhile, the orthogonal-modulated signal is inverted by an inverter 315, and combined with the output signal of the multiplexer 313. In this case, the orthogonal code generated from the inverter 315 serves as a sign bit (MSB).

Describing the operation of the gain adjustments 218–222 having the structure as shown in FIG. 3, the multipliers 212–216 are 1-bit multipliers for performing 1-bit multiplication, and therefore may consist of exclusive-OR gates. The output signals of the multipliers 212–216 are inputted to their respective gain adjustments 218–222. The orthogonal-modulated transmission signals applied to the gain adjustments 218–222 are "1" or "0", and are delivered as selection signals to the multiplexer 313. In this case, the selection signals are integer data. Then, the multiplexer 313 selectively outputs the channel gain control value or 2's complement thereof. The channel gain control value is for adjusting the gain of the corresponding channel, and the 2's complement of the channel gain control value is taken by the 2's complement circuit. These values are binary data. The orthogonal-modulated signal is inverted by an inverter 315, and is outputted as a sign bit combined with the channel gain control value or its 2's complement of the multiplexer 313. After the spread signal gains of the channels are adjusted by corresponding gain adjustments 218–222, the adders 224 and 226 combine the output signals of the channels as described.

More specifically describing the operation of the circuit as shown in FIG. 3, the orthogonal-modulated transmission signals produced from the Walsh modulator of the multipliers 212 to 216 have a value of 1 (corresponding to +1) or 0 (corresponding to −1). Hence, if the output of the Walsh modulator is 1, the sign bit (output data[8]) of the inverter 315 becomes 0(zero), and accordingly the multiplexer 313 selects the channel gain control value, so that the finally outputted data [8:0] comes to have a positive sign bit. Namely, the channel gain control value becomes the output data [7:0] itself. By contrast, if the output of the Walsh modulator is 0, the sign bit (output data) of the inverter 315 becomes 1, and accordingly the multiplexer 313 selects the 2's complement of the channel gain control value, so that the final output data [8:0] comes to have a negative sign bit, with the 2's complement becoming the output data [7:0]. Thus, the circuit as shown in FIG. 3 multiplies the Walsh modulated data by the gain.

The transmitter as shown in FIGS. 2 and 3 modulates the transmission data inputted to each channel with the corresponding orthogonal code, and multiplies the resulting orthogonal-modulated signal by the gain control value of the corresponding channel. In this case, the gain control values Gc, Gs, Gf respectively supplied from a controller (not shown) to the gain adjustments 218 to 222 are for adjusting the gains of the orthogonal-modulated signals of the corresponding channels. Then, the data from the pilot channel is combined with the data from the dedicated control channel, and the data from the supplemental channel is combined with the data from the fundamental channel, in order to obtain I-channel data and Q-channel data respectively applied to the I- and Q-channels of the complex spreader. The complex spread data is then applied to the band-pass filters 244 and 246, whose output signals are adjusted for gains and then loaded on the carrier waves.

Describing more specifically the operation of the gain adjustments 218 to 222 with reference to FIG. 3, the sign bit of the output data is obtained by inverting the orthogonal-modulated signal by the inverter 315. The orthogonal-modulated signal is simultaneously applied as the selection signal to the multiplexer 313. In this case, the output signal (excluding the sign bit) becomes the gain control value or the complement of "2" thereof, depending upon whether the orthogonal-modulated signal is a "1" or a "0". An output circuit (not shown) adds the inverted signal of the orthogonal modulated signal as a sign bit to the output signal of the multiplexer. In the present embodiment, the input data corresponding to the gain is 8-bit (0–255), where the output data is 9-bit. It may be also applied when the bit size of the input data is arbitrarily determined.

Figure 4:
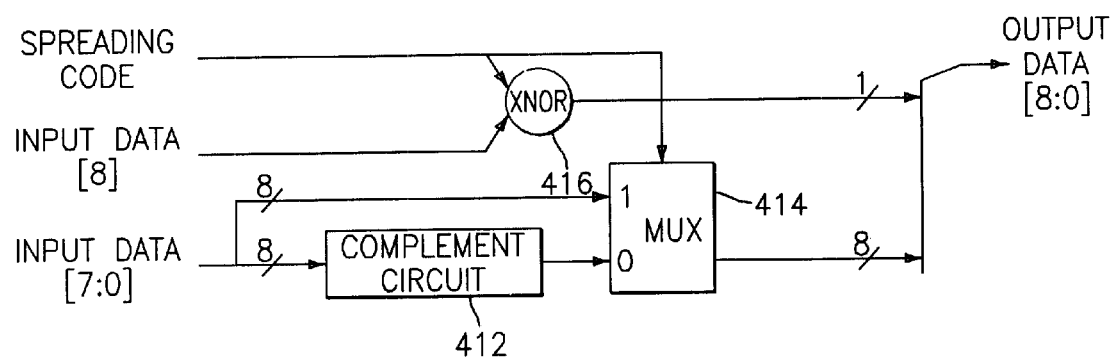
FIG. 4 is a block diagram for illustrating the structure of a complex spreader for spreading the input data by the short PN code spread with the long PN code of FIG. 2.

FIG. 4 illustrates the structure of a complex spreader for spreading the integer type input data by using the PN sequence spread by the long code. The 2's complement circuit 412 selects the 2's complement of the input data [7:0] excluding the input data [8] representing the sign bit of the input data [8:0] produced from the adders 224 and 226. The output data of the adders 224 and 226 and of the complement circuit 412 are delivered to a multiplexer 414, which also receives as the selection signal the PN sequence spread by the long code supplied by the multipliers 228 and 230, so that the multiplexer 414 may select the input data [7:0] or the 2's complement thereof. The spread PN sequence and the input data [8] representing the sign bit are logically combined by an exclusive NOR gate 416, whose output is combined with the output of the multiplexer 414, generating the output data [8:0]. In this case, the output of the XNOR 416 serves as the sign bit (MSB) of the output data [7:0] produced from the multiplexer 414.

Describing the operation of the circuit of FIG. 4, the input data [8:0] is the output data [8:0] of the adders 224 and 226, having positive or negative value according as the sign bit [8] is 0(zero) or 1. Meanwhile, the spread PN sequence supplied by the multipliers 228 and 230 has a value of 1(corresponding to +1) or 0(corresponding to −1). The circuit is to multiply the input data [8:0] by the PN sequence. If the PN sequence is 1, the input data [8:0] is multiplied by +1, producing the output data [7:0]. In this case, the sign bit [8] of the output data is determined by the sign bit [8] of the input data. Hence, the input data [8] and the spread PN sequence are logically combined by XNOR gate 416. If the spread code is 0, the input data is multiplied by −1, producing the output data [7:0] which is the 2's complement of the input data [7:0], so that the sign bit [8] of the input data is inverted. Consequently, the input data [8] and the spread PN sequence are logically combined by the XNOR gate 416 to produce the output data [8]. Thus, the circuit of FIG. 4 uses the PN code spread by the long code to spread the integer type input data adjusted by the gain adjustments 218 to 222. The sign of the output data becomes positive or negative depending on whether the sign of the spread PN sequence is equal to that of the input data. In this case, the output data excluding the sign bit becomes the complement of "2" of the input signal except for the sign bit, or the input signal except for the sign bit, depending on whether the short PN sequence spread by the long signal is "0" or "1". In the present embodiment, the input data is 8-bit. It may be also applied when the bit size of the input data is arbitrarily determined.

In the above embodiments, it is assumed that the orthogonal-modulated signal and spread PN sequence have the value of 1 or 0 to correspond to +1 or −1. However, these may be conversely defined. Namely, if it is defined that these have the value of 1 or 0 to correspond to −1 or +1, the inverter 315 of FIG. 3 is not required, and the XNOR gate 416 should be replaced by an XOR gate.

As described above, the inventive transmitter does not require a circuit for multiplying the orthogonal-modulated signal converted into binary data by the channel gain control value. Instead, it is structured to select the channel gain control value or the 2's complement thereof depending on the orthogonal-modulated data, thereby simplifying the hardware structure. Moreover, it does not require a circuit for multiplying the spread PN sequence converted into binary data by the input data. Instead, it is structured to select the input data or the 2's complement thereof depending on the spread PN sequence. While the present invention has been described with specific embodiments accompanied by the attached drawings, it will be appreciated by those skilled in the art that various changes and modifications may be made thereto without departing from the gist of the present invention.

What is claimed is:

1. A transmitter provided in a mobile station of a CDMA communications system comprising:
   an orthogonal modulator for orthogonal-modulating channel- coded transmission signals with orthogonal codes of corresponding channels;
   a gain control value generator for obtaining a complement of a first channel gain control value corresponding to a channel to generate a second channel gain control value; and
   a selection circuit for selecting one of said first and second channel gain control values by an orthogonal-modulated signal;
   wherein said orthogonal-modulated signal is input into said selection circuit to control the selecting of said first or second channel gain control value.

2. The transmitter as defined in claim 1, further including an output circuit for adding an inverted orthogonal-modulated signal as a sign bit of the channel gain control value selected by said selection circuit.

3. A transmitter provided in a mobile station of a CDMA communications system comprising:
   a sequence generator for spreading input data into a spread PN sequence;
   a data generator for obtaining a complement of a first input data corresponding to a channel adjusted with a channel gain to generate a second input data;
   a selection circuit for selecting one of said first and second input data by said spread PN sequence; and
   a sign bit generator for determining a sign bit of the selected input data by performing a logical operation on a sign bit of said first input data and said spread PN sequence;
   wherein said spread PN sequence is input into said selection circuit used to control the selecting of said first or second input data.

4. A transmitter as defined in claim 3, wherein said sign bit generator is an exclusive NOR gate.

5. A method of transmitting signals in a mobile station of a CDMA communications system comprising the steps of:
   orthogonal-modulating channel- coded transmission signals with orthogonal codes of corresponding channels;
   obtaining a complement of a first channel gain control value corresponding to a channel to generate a second channel gain control value; and
   selecting one of said first and second channel gain control values by an orthogonal-modulated signal;
   wherein said orthogonal-modulated signal is a control signal to control the selecting of said first or second channel gain control value.

6. A method of transmitting signals in a mobile station of a CDMA communications system comprising the steps of:
   spreading input data into a spread PN sequence;
   obtaining the complement of a first input data corresponding to a channel adjusted with a channel gain to generate a second input data;
   selecting one of said first and second input data by said spread PN sequence; and
   determining a sign bit of the selected input data by performing a logical operation on a sign bit of said first input data and said spread PN sequence;
   wherein said spread PN sequence is a control signal used to control the selecting of said first or second input data.

7. A transmitter provided in a mobile station of a CDMA communications system comprising:
   a gain adjustment including an orthogonal modulator for orthogonal-modulating channel-coded transmission signals with orthogonal codes of corresponding channels, a complement circuit for obtaining a 2's complement of a channel gain control value, a multiplexer for selecting said channel gain control value or the output of said complement circuit according to an orthogonal-modulated signal, and an output circuit for adding an inverted orthogonal-modulated signal as a sign bit to generate channel gain adjusted data; and
   a spreader including a complement circuit for obtaining a 2's complement of an input data of a channel adjusted with a channel gain, a multiplexer for selecting the input data of the channel or an output of said complement circuit by a spread PN sequence, an exclusive NOR gate for logically combining a spread PN sequence and a sign bit, and an adder for adding said sign bit to the output of said multiplexer;
   wherein said orthogonal-modulated signal is input into said multiplexer of said gain adjustment to control the multiplexing, and said spread PN sequence is input into said multiplexer of said spreader to control the multiplexing.

* * * * *